(12) United States Patent  (10) Patent No.: US 8,473,847 B2
Glover (45) Date of Patent: Jun. 25, 2013

(54) METHODS AND SYSTEMS FOR COMPARING PRESENTATION SLIDE DECKS

(75) Inventor: Robin Wallace Glover, Oxforshire (GB)

(73) Assignee: Workshare Technology, Inc., San Francisco, CA (US)

( * ) Notice: Subject to any disclaimer, the term of this patent is extended or adjusted under 35 U.S.C. 154(b) by 328 days.

(21) Appl. No.: 12/844,818

(22) Filed: Jul. 27, 2010

(65) Prior Publication Data
US 2011/0022960 A1    Jan. 27, 2011

Related U.S. Application Data

(60) Provisional application No. 61/228,901, filed on Jul. 27, 2009.

(51) Int. Cl.
*G06F 3/00* (2006.01)

(52) U.S. Cl.
USPC ............... 715/730; 715/731; 715/732

(58) Field of Classification Search
USPC ................................. 715/730–732
See application file for complete search history.

(56) References Cited

U.S. PATENT DOCUMENTS

| | | |
|---|---|---|
| 4,479,195 A | 10/1984 | Herr et al. |
| 4,949,300 A | 8/1990 | Christenson et al. |
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,634,062 A | 5/1997 | Shimizu et al. |
| 5,671,428 A | 9/1997 | Muranaga et al. |
| 5,699,427 A | 12/1997 | Chow et al. |

(Continued)

FOREIGN PATENT DOCUMENTS

| | | |
|---|---|---|
| JP | 10177650 A | 6/1998 |
| JP | 2004265267 A | 9/2004 |

(Continued)

OTHER PUBLICATIONS

PC Magazine "Pure Intranets: Real-TIme Internet Collaboration", http://www.zdnet.com/pcmag/featuresgroupware/gpwst.htm, Aug. 30, 2001, 2 pages.

(Continued)

*Primary Examiner* — Tuyetlien Tran
(74) *Attorney, Agent, or Firm* — Ted Sabety, Esq.; Sabety & Associates, PLC

(57) ABSTRACT

Disclosed herein are methods and systems for comparing two slide decks using a compare service. The compare service generates a comparison analysis for the two slide decks based on a comparison theme selected by the user. The result of the analysis is displayed in a comparison display that includes a slide selector section, a slide pair viewer section, and a navigable change summary section. In one embodiment, the compare service allows the user to select preferred slides from the two slide decks displayed in the comparison display, and subsequently generates a new slide deck that contains only the preferred slides selected by the user.

31 Claims, 11 Drawing Sheets

U.S. PATENT DOCUMENTS

| | | | |
|---|---|---|---|
| RE35,861 E | 7/1998 | Queen | |
| 5,787,175 A | 7/1998 | Carter | |
| 5,801,702 A | 9/1998 | Dolan et al. | |
| 5,806,078 A * | 9/1998 | Hug et al. | 715/205 |
| 5,819,300 A | 10/1998 | Kohno et al. | |
| 5,832,494 A | 11/1998 | Egger et al. | |
| 5,890,177 A | 3/1999 | Moody et al. | |
| 5,898,836 A | 4/1999 | Freivald et al. | |
| 6,003,060 A | 12/1999 | Aznar et al. | |
| 6,012,087 A | 1/2000 | Freivald et al. | |
| 6,049,804 A | 4/2000 | Burgess et al. | |
| 6,067,551 A | 5/2000 | Brown et al. | |
| 6,088,702 A | 7/2000 | Plantz et al. | |
| 6,145,084 A | 11/2000 | Zuili et al. | |
| 6,189,019 B1 | 2/2001 | Blumer et al. | |
| 6,212,534 B1 | 4/2001 | Lo et al. | |
| 6,219,818 B1 | 4/2001 | Freivald et al. | |
| 6,243,091 B1 | 6/2001 | Berstis | |
| 6,263,350 B1 | 7/2001 | Wollrath et al. | |
| 6,263,364 B1 | 7/2001 | Najork et al. | |
| 6,269,370 B1 | 7/2001 | Kirsch | |
| 6,285,999 B1 | 9/2001 | Page | |
| 6,301,368 B1 | 10/2001 | Bolle et al. | |
| 6,321,265 B1 | 11/2001 | Najork et al. | |
| 6,336,123 B2 | 1/2002 | Inoue et al. | |
| 6,351,755 B1 | 2/2002 | Najork et al. | |
| 6,377,984 B1 | 4/2002 | Najork et al. | |
| 6,404,446 B1 | 6/2002 | Bates et al. | |
| 6,418,433 B1 | 7/2002 | Chakrabarti et al. | |
| 6,418,453 B1 | 7/2002 | Kraft et al. | |
| 6,424,966 B1 | 7/2002 | Meyerzon et al. | |
| 6,449,624 B1 | 9/2002 | Hammack et al. | |
| 6,513,050 B1 | 1/2003 | Williams et al. | |
| 6,547,829 B1 | 4/2003 | Meyerzon et al. | |
| 6,560,620 B1 | 5/2003 | Ching | |
| 6,584,466 B1 | 6/2003 | Serbinis et al. | |
| 6,594,662 B1 | 7/2003 | Sieffert et al. | |
| 6,596,030 B2 * | 7/2003 | Ball et al. | 715/234 |
| 6,614,789 B1 | 9/2003 | Yazdani et al. | |
| 6,658,626 B1 | 12/2003 | Aiken | |
| 7,035,427 B2 | 4/2006 | Rhoads | |
| 7,107,518 B2 | 9/2006 | Ramaley et al. | |
| 7,152,019 B2 | 12/2006 | Tarantola et al. | |
| 7,212,955 B2 | 5/2007 | Kirshenbaum et al. | |
| 7,233,686 B2 | 6/2007 | Hamid | |
| 7,240,207 B2 | 7/2007 | Weare | |
| 7,299,504 B1 | 11/2007 | Tiller et al. | |
| 7,356,704 B2 | 4/2008 | Rinkevich et al. | |
| 7,434,164 B2 * | 10/2008 | Salesin et al. | 715/731 |
| 7,454,778 B2 | 11/2008 | Pearson et al. | |
| 7,496,841 B2 | 2/2009 | Hadfield et al. | |
| 7,564,997 B2 | 7/2009 | Hamid | |
| 7,624,447 B1 | 11/2009 | Horowitz et al. | |
| 7,627,613 B1 | 12/2009 | Dulitz et al. | |
| 7,673,324 B2 | 3/2010 | Tirosh et al. | |
| 7,680,785 B2 | 3/2010 | Najork | |
| 7,694,336 B2 | 4/2010 | Rinkevich et al. | |
| 7,857,201 B2 | 12/2010 | Silverbrook et al. | |
| 7,877,790 B2 | 1/2011 | Vishik et al. | |
| 7,890,752 B2 | 2/2011 | Bardsley et al. | |
| 8,005,277 B2 | 8/2011 | Tulyakov et al. | |
| 8,042,112 B1 | 10/2011 | Zhu et al. | |
| 8,181,036 B1 | 5/2012 | Nachenberg | |
| 2002/0010682 A1 | 1/2002 | Johnson | |
| 2002/0019827 A1 | 2/2002 | Shiman et al. | |
| 2002/0023158 A1 | 2/2002 | Polizzi et al. | |
| 2002/0052928 A1 | 5/2002 | Stern et al. | |
| 2002/0063154 A1 | 5/2002 | Hoyos et al. | |
| 2002/0065827 A1 | 5/2002 | Christie et al. | |
| 2002/0065848 A1 | 5/2002 | Walker et al. | |
| 2002/0073188 A1 | 6/2002 | Rawson | |
| 2002/0087515 A1 | 7/2002 | Swannack et al. | |
| 2002/0099602 A1 | 7/2002 | Moskowitz et al. | |
| 2002/0129062 A1 | 9/2002 | Luparello | |
| 2002/0136222 A1 | 9/2002 | Robohm | |
| 2002/0159239 A1 | 10/2002 | Amie et al. | |
| 2003/0037010 A1 | 2/2003 | Schmelzer | |
| 2003/0061260 A1 | 3/2003 | Rajkumar | |
| 2003/0131005 A1 | 7/2003 | Berry | |
| 2003/0158839 A1 | 8/2003 | Faybishenko et al. | |
| 2004/0002049 A1 * | 1/2004 | Beavers et al. | 434/350 |
| 2005/0138540 A1 * | 6/2005 | Baltus et al. | 715/511 |
| 2005/0251748 A1 * | 11/2005 | Gusmorino et al. | 715/713 |
| 2006/0005247 A1 | 1/2006 | Zhang et al. | |
| 2006/0021031 A1 | 1/2006 | Leahy et al. | |
| 2006/0050937 A1 | 3/2006 | Hamid | |
| 2006/0059196 A1 | 3/2006 | Sato et al. | |
| 2006/0064717 A1 | 3/2006 | Shibata et al. | |
| 2006/0067578 A1 * | 3/2006 | Fuse | 382/190 |
| 2006/0098850 A1 | 5/2006 | Hamid | |
| 2006/0112120 A1 | 5/2006 | Rohall | |
| 2006/0171588 A1 | 8/2006 | Chellapilla et al. | |
| 2006/0218004 A1 * | 9/2006 | Dworkin et al. | 705/1 |
| 2006/0224585 A1 | 10/2006 | Rowney et al. | |
| 2006/0236246 A1 * | 10/2006 | Bono et al. | 715/730 |
| 2006/0271947 A1 | 11/2006 | Lienhart et al. | |
| 2006/0294468 A1 * | 12/2006 | Sareen et al. | 715/730 |
| 2006/0294469 A1 * | 12/2006 | Sareen et al. | 715/730 |
| 2007/0005589 A1 | 1/2007 | Gollapudi | |
| 2007/0101154 A1 | 5/2007 | Bardsley et al. | |
| 2007/0101413 A1 | 5/2007 | Vishik et al. | |
| 2007/0192728 A1 * | 8/2007 | Finley et al. | 715/782 |
| 2007/0253608 A1 | 11/2007 | Tulyakov et al. | |
| 2007/0261112 A1 | 11/2007 | Todd et al. | |
| 2007/0294318 A1 * | 12/2007 | Arora et al. | 707/202 |
| 2007/0294612 A1 * | 12/2007 | Drucker et al. | 715/500.1 |
| 2008/0033913 A1 | 2/2008 | Winburn | |
| 2008/0080515 A1 | 4/2008 | Tombroff et al. | |
| 2008/0082529 A1 * | 4/2008 | Mantena et al. | 707/6 |
| 2008/0219495 A1 | 9/2008 | Hulten et al. | |
| 2008/0320316 A1 | 12/2008 | Waldspurger et al. | |
| 2009/0034804 A1 | 2/2009 | Cho et al. | |
| 2009/0064326 A1 | 3/2009 | Goldstein | |
| 2009/0129002 A1 | 5/2009 | Wu et al. | |
| 2009/0241187 A1 | 9/2009 | Troyansky | |
| 2010/0017850 A1 | 1/2010 | More et al. | |
| 2010/0064372 A1 | 3/2010 | More et al. | |
| 2010/0070448 A1 | 3/2010 | Omoigui | |
| 2010/0114985 A1 * | 5/2010 | Chaudhary et al. | 707/803 |
| 2010/0114991 A1 * | 5/2010 | Chaudhary et al. | 707/809 |
| 2010/0299727 A1 | 11/2010 | More et al. | |

FOREIGN PATENT DOCUMENTS

| | | |
|---|---|---|
| JP | 2007299364 A | 11/2007 |
| KR | 20040047413 A | 6/2004 |
| KR | 200070049518 A | 5/2007 |
| KR | 1020080029602 | 4/2008 |
| WO | WO-0060504 A1 | 10/2000 |

OTHER PUBLICATIONS

Wells et al., "Groupware & Collaboration Support", www.objs.com/survey/groupwar.htm, Aug. 30, 2001, 10 pages.

Tsai, et al., "A Document Workspace for Collaboration and Annotation based on XML Technology", IEEE, 2000, pp. 165-172.

Roussev, et al., "Integrating XML and Object-based Programming for Distributed Collaboration", IEEE, 2000, pp. 254-259.

XP-002257904, "Workshare Debuts Synergy", 2003, 3 pages.

International Search Report of PCT Application No. PCT/IB2002/005821, Jan. 30, 2004, 6 pages.

International Search Report of PCT Application No. PCT/US2009/051313, Mar. 3, 2010, 3 pages.

Written Opinion of PCT Application No. PCT/US2009/051313, Mar. 3, 2010, 4 pages.

Co-pending U.S. Appl. No. 10/136,733, filed Apr. 30, 2002.

Co-pending U.S. Appl. No. 10/023,010, filed Dec. 17, 2001.

Non-Final Office Action Mailed Mar. 20, 2006 in Co-pending U.S. Appl. No. 10/136,733, filed Apr. 30, 2002.

Notice of Allowance Mailed Oct. 24, 2008 in Co-pending U.S. Appl. No. 10/023,010, filed Dec. 17, 2001.

Non-Final Office Action Mailed May 7, 2008 in Co-pending U.S. Appl. No. 10/023,010, filed Dec. 17, 2001.

International Search Report of PCT Application No. PCT/US2009/056668, Apr. 16, 2010, 9 pages.

Written Opinion PCT Application No. PCT/US2009/056668, Apr. 16, 2010, 4 pages.

Weiss et al., Lightweight document matching for help-desk applications, In: Intelligent Systems and their Applications, IEEE, Vo. 15, Issue:2, pp. 57-61, ISSN 1094-7167, 2000.

International Search Report of PCT Application No. PCT/US2009/065019, Jun. 4, 2010, 6 pages.

Written Opinion PCT Application No. PCT/US2009/065019, Jun. 4, 2010, 5 pages.

International Search Report of PCT Application No. PCT/2009/064919, Jul. 1, 2010, 3 pages.

Written Opinion PCT Application No. PCT/2009/064919, Jul. 1, 2010, 4 pages.

Written Opinion of PCT Application No. PCT/US2009/051313, Mar. 3, 2010, 3 pages.

Co-pending U.S. Appl. No. 12/844,818, filed Jul. 27, 2010.

Final Office Action Mailed Apr. 17, 2007 for U.S. Appl. No. 10/023,010, filed Dec. 17, 2001, Issued Patent No. 7,496,841.

Final Office Action Mailed Aug. 12, 2011 for U.S. Appl. No. 12/209,096, filed Sep. 11, 2008.

International Search Report of PCT Application No. PCT/US2010/043345, Apr. 28, 2011, 3 pages.

Non-Final Office Action Mailed Dec. 22, 2011 in Co-Pending U.S. Appl. No. 12/209,082.

Non-Final Office Action Mailed Jan. 9, 2012 in Co-Pending U.S. Appl. No. 12/177,043, filed Jul. 21, 2008.

Non-Final Office Action Mailed Mar. 11, 2011 in Co-pending U.S. Appl. No. 12/209,096, filed Sep. 11, 2008.

Non-Final Office Action Mailed Mar. 16, 2006 for U.S. Appl. No. 10/023,010, filed Dec. 17, 2001, Issued Patent No. 7,496,841.

Non-Final Office Action Mailed Sep. 19, 2011 for U.S. Appl. No. 12/177,043, filed Jul. 21, 2008.

Restriction Requirement Mailed Feb. 14, 2005 for U.S. Appl. No. 10/023,010, filed Dec. 17, 2001, Issued Patent No. 7,496,841.

Restriction Requirement Mailed Feb. 5, 2008 for U.S. Appl. No. 10/023,010, filed Dec. 17, 2001, Issued Patent No. 7,496,841.

Restriction Requirement Mailed Jun. 30, 2006 for U.S. Appl. No. 10/136,733, filed Apr. 30, 2002.

Monga, et al., "Perceptual Image Hashing Via Feature Points: Performance Evaluation and Tradeoffs," IEEE Tranactions on Image Processing, vol. 15, No. 11, Nov. 2006.

Monga, "Robust Perceptual Image Hashing Using Feature Points," http://bluecoat-02/?cfru=aHROcDovL3NpZ25hbC51Y2UudX RIeGFzLmVkdS9+dmIzaGFsL2hhc2gtcGFydEkucHM=, 2003.

Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.

Xuefeng Liang; et al., "Fingerprint Matching Using Minutia Polygons," Pattern Recognition, 2006, ICPR 2006, 18th International Conference on, vol. 1, No., pp. 1046-1049.

Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.

Yung, et al., "Generating Robust Digital Signature for Image/Video Authentication," Multimedia and Security Workshop at ACM Multimedia '98, Bristol, U.K., Sep. 1998.

International Search Report of PCT Application No. PCT/US2009/056651, Dated Apr. 21, 2010, pp. 1-3.

Written Opinion PCT/US2009/056651 dated Apr. 21, 2010, pp. 1-5.

Non-Final Office Action Mailed Aug. 1, 2012 in Co-Pending U.S. Appl. No. 12/621,429, filed Nov. 18, 2009.

Notice of Allowance Mailed Aug. 19, 2012 in Co-Pending U.S. Appl. No. 12/177,043, filed Jul. 21, 2008.

Final Office Action Mailed May 10, 2012 in Co-Pending U.S. Appl. No. 12/209,082, filed Sep. 11, 2008.

Notice of Allowance Mailed Jun. 26, 2012 in Co-Pending U.S. Appl. No. 12/275,185, filed Nov. 20, 2008.

Final Office Action Mailed Apr. 16, 2012 in Co-Pending U.S. Appl. No. 12/177,043, filed Jul. 21, 2008.

Non-Final Office Action Mailed Apr. 27, 2012 in Co-Pending U.S. Appl. No. 12/275,185, filed Nov. 20, 2008.

Co-pending U.S. Appl. No. 12/621,429, filed Nov. 18, 2009.

Co-pending U.S. Appl. No. 12/177,043, filed Jul. 21, 2008.

Co-pending U.S. Appl. No. 12/275,185, filed Nov. 20, 2008.

Co-pending U.S. Appl. No. 12/209,082, filed Sep. 11, 2008.

Co-pending U.S. Appl. No. 12/209,096, filed Sep. 11, 2008.

Co-pending U.S. Appl. No. 13/620,364, filed Sep. 14, 2012.

Co-Pending U.S. Appl. No. 13/659,793, filed Oct. 24, 2012.

Co-Pending U.S. Appl. No. 13/659,817, filed Oct. 24, 2012.

* cited by examiner

METHODS AND SYSTEMS FOR COMPARING PRESENTATION SLIDE DECKS

CLAIM OF PRIORITY

This application claims priority to U.S. Provisional Patent Application No. 61/228,901, entitled METHODS AND SYSTEMS FOR COMPARING PRESENTATION SLIDE DECKS, filed Jul. 27, 2009, which is hereby incorporated by reference in its entirety.

FIELD OF INVENTION

The present invention generally relates to the field of digital document review. More particularly, the present invention relates to methods and systems for detecting changes and/or differences between an original slide deck and a modified slide deck.

BACKGROUND OF THE INVENTION

In today's digital world, public presentations, be it in the form of an office meeting or a massive product exhibition, are most effectively delivered using computer projected images. There are several products in the market that offer a suite of tools to help a person build presentation files (or "slide decks"). Examples of such products include Microsoft PowerPoint®, Adobe Flash®, Apple Keynote®, etc.

In several scenarios, a user may go through multiple revisions of slide decks to improve the content and presentability of the slide deck contents. In doing so, a user may wish to compare a latest version of the slide deck with a prior version to determine the changes that have been made to the latest version. The user may not only want to review changes made to textual information, but also to other features specific to slide decks (such as, for example, changes to slide master views, changes to animation sequences, changes to multimedia content, etc.). Additionally, the person may also wish to retain selected slides from the latest slide deck and some selected slides from prior versions of the slide deck. However, to do that, the user would have to manually establish a new slide deck using a slide deck editing application (e.g., Microsoft PowerPoint®), and painstakingly copy over individual slides from various versions of the slide deck.

Overall, the examples herein of some prior or related systems and their associated limitations are intended to be illustrative and not exclusive. Other limitations of existing or prior systems will become apparent to those of skill in the art upon reading the following Detailed Description.

SUMMARY OF THE DESCRIPTION

At least one embodiment of this invention pertains to a compare service that enables a user to compare a first slide deck and a second slide deck. The compare service may run as a standalone service on a user's computing device or, in some instances, may run as a web service on a remote server. In either scenario, the compare service receives as input the two slide decks that a person wishes to compare. The compare service also allows the user to select a comparison theme through which the user can customize the type of changes (e.g., changes to text, changes to slide master, changes to images, etc.) that are to be detected by the compare service.

Subsequent to receiving the requests, the compare service generates a comparison report by identifying differences between each presentation slide of the first slide deck with a corresponding presentation slide of the second slide deck (i.e., by comparing constituent slides of "slide pairs"). In one embodiment, the compare service uses a comparison display to display the detected changes. The comparison display includes at least three sections that can be selectively activated by the user. A first section is a slide selector section that presents thumbnail images of the slide pair to enable a user to select a particular slide pair to examine. When the user selects a thumbnail image of a particular slide pair, the constituent slides of the slide pair are displayed in an expanded view in a slide pair viewer section. A third section, the change summary section, displays a navigable list of changes (with description of the changes) relevant to the slides displayed in the slide pair viewer. When a user selects a particular item in the list of changes, the change/difference corresponding to the selected item is visually highlighted in the slides displayed in the slide pair viewer.

In one embodiment, the user can select a "preferred slide" from each slide pair that he wishes to retain in a newly created slide deck. The user can choose one of the two constituent slides of each slide pair to make the "preferred slide" selection. Alternatively, in some instances, the user can choose to edit one of the constituent slides in an external application, and use the edited slide as the preferred slide selection. In either scenario, subsequent to the user making a preferred slide selection within each slide pair, the compare service generates a new file that constitutes a new slide deck containing only the preferred slides chosen by the user. In some instances, the user will be able to accept or reject individual changes detected by a comparison, producing a new slide deck containing, in addition to the contents of the original slide deck, only those changes that were marked as accepted. In some instances, the accepting or rejecting of changes will cause corresponding changes to be made to a working slide deck immediately, the contents of the working slide deck may or may not be visible to the user.

Other advantages and features will become apparent from the following description and claims. It should be understood that the description and specific examples are intended for purposes of illustration only and not intended to limit the scope of the present disclosure.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

Figure 1A:
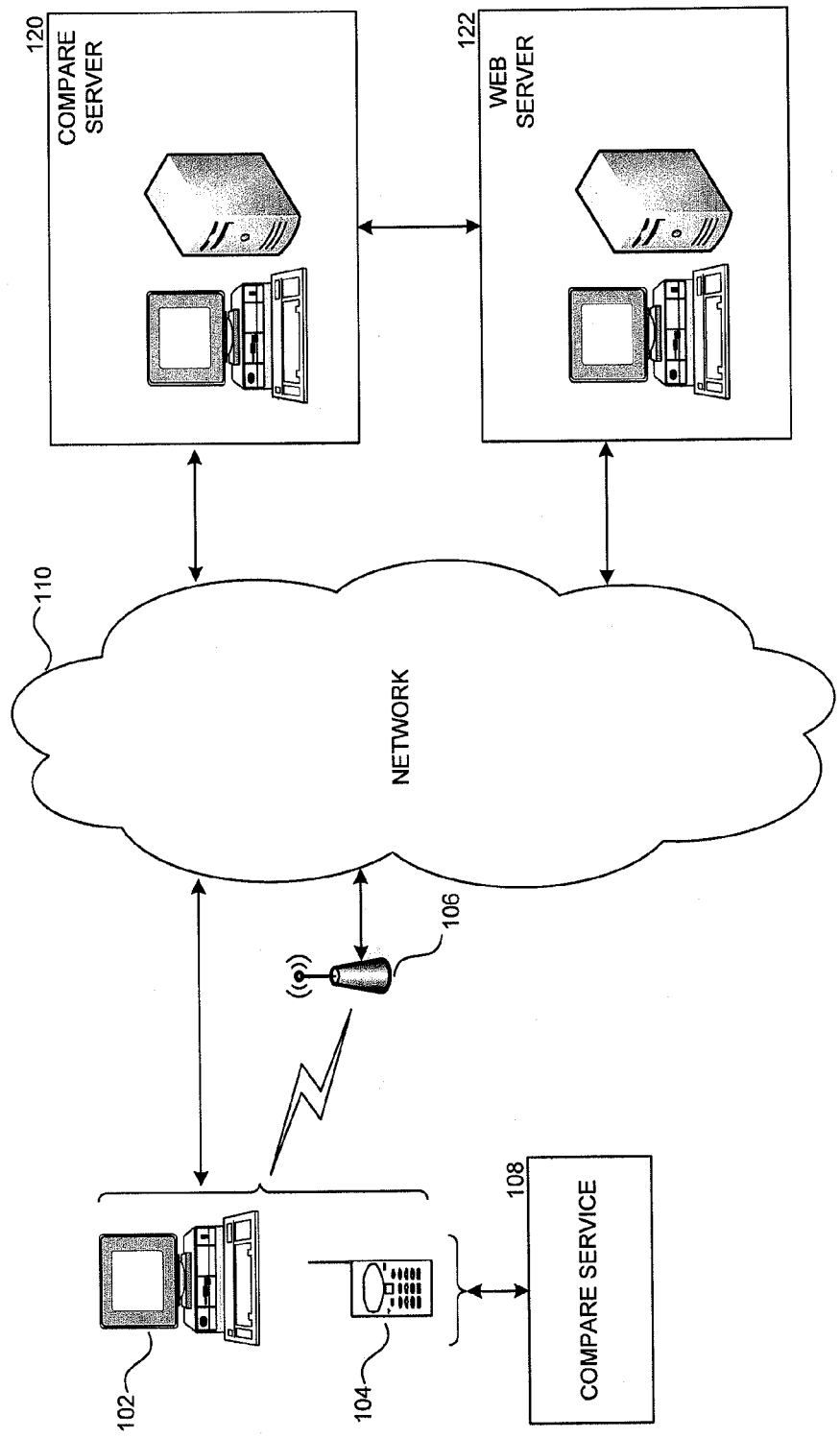
FIG. 1A and the following discussion provide a brief, general description of a representative environment in which the invention can be implemented.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION OF THE INVENTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1A and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1A, a user may use a personal computing device (e.g., a mobile computing device 104, a personal computer 102, etc.) to execute functionalities for the techniques described herein. The user may also use the personal computing device to communicate with a network. The term "mobile computing device," as used herein, may be a laptop, a netbook, a personal digital assistant (PDA), a smart phone (e.g., a Blackberry®, an Iphone®, etc.), a portable media player (e.g., an IPod Touch®), or any other device having communication capability to connect to the network. In one example, the mobile computing device 104 connects to the network using one or more cellular transceivers or base station antennas (not shown in FIG. 1), access points, terminal adapters, routers or modems 106 (in IP-based telecommunications implementations), or combinations of the foregoing (in converged network embodiments).

In some instances, the network 110 is the Internet, allowing the personal computing device to access functionalities offered through, for example, the compare server 120 or various web servers. In some instances, the network is a local network maintained by a private entity or a wide area public network, or a combination of any of the above types of networks. In some instances, especially where the mobile computing device 104 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

As shown in FIG. 1A, in some instances, the personal computing device may have a compare service 108 installed locally. In such instances, the user may use the personal computing device to submit presentation documents (i.e., slide decks) to be compared by the compare service. As will be explained in detail below, the compare service 108, running on the personal computing device, receives two slide decks to be compared and subsequently performs a comparison analysis. In such an instance, the compare service 108 presents a comparison display to the user using a display unit of the personal computing device. Accordingly, the compare service 108 runs as a stand-alone service without requiring a connection to the network 110.

In some instances, the compare service is configured to run remotely on a compare server 120. In such an instance, the compare service is run akin to a web or internet service in conjunction with a web server 122. As explained above, a user may use a personal computing device to connect to the compare server 120 using the network (e.g., a local office network, the Internet, etc.). In an illustrative example of such an instance, the user would use the personal computing device to upload two slide decks that are to be compared. The compare server 120 receives the slide decks transmitted by the personal computing device and executes one or more comparison functionalities. Subsequent to performing a comparison analysis, the compare server 120 transmits a comparison display to the personal computing device, which is then displayed using a display unit of the personal computing device. In some instances, the compare server 120 may by itself operate as a web server to receive and transmit contents using standard web protocols. In other instances, the compare server 120 may be coupled to a web server 122, where the compare server performs the various comparison services, while the web server enables the transmission and reception of data using standard web protocols.

Figure 1B:
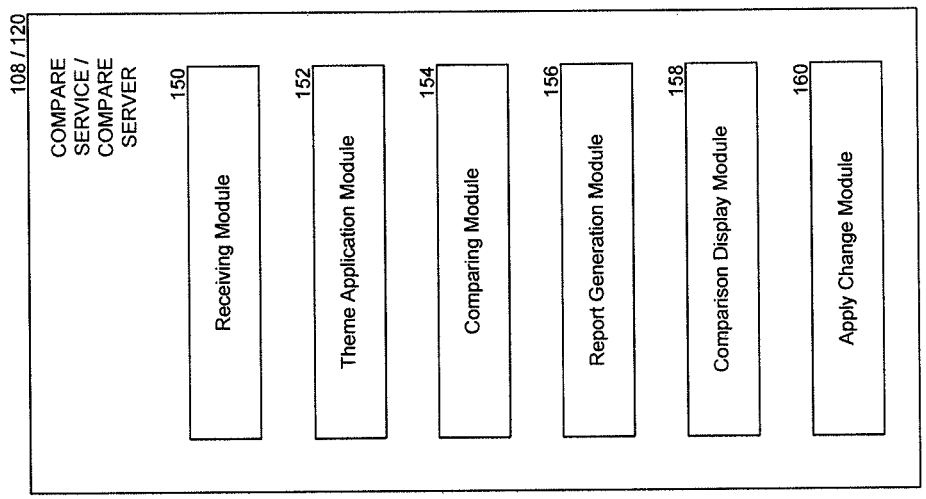
FIG. 1B is a block diagram illustrating an exemplary architecture of a compare service or a service of the compare server.

FIG. 1B is a block diagram illustrating an exemplary architecture of a compare service 108 or a service of the compare server 120 (generally, of a compare service). In the illustrated embodiment, the compare service includes a plurality of functional modules, each of the functional modules configured to perform a unique function of the compare service. The various functional modules can be implemented by using programmable circuitry programmed by software and/or firmware, or by using special-purpose hardwired circuitry, or by using a combination of such embodiments. In some instances, the functional modules are implemented as units in a processor of the compare server.

The functional modules include a receiving module 150. In some instances, the receiving module 150 is configured to receive the two slide decks that a user wishes to compare against each other. In some instances, the receiving module 150 is in the form of a graphic UI that allows the user to select and upload the slide decks from the user's personal computing device. In other instances, the receiving module 150 accepts the inputs from the user through a command-line interface. In some instances, the receiving module 150 ensures the validity of the uploaded files (e.g., file of proper slide deck format, etc.). Also, in some instances, subsequent to receiving the slide decks uploaded by the user, the receiving module 150 transfers the slide decks to, for example, a comparing module 154 for further processing. In some instances the receiving module will convert the received presentation to an alternate file format before it is processed by the comparing module.

The functional modules include a theme application module 152. The theme application module 152 is responsible for applying a certain combination of parameters to process the comparison of the two slide decks. Examples of such parameters include: detection of just text based differences between the slide decks, detection of formatting changes between the two slide decks, detection of changes to slide master content between the two slide decks etc. Additional examples will be discussed in detail further below. In some instances, the user can create a customized comparison theme (by customizing the selection of one or more comparison theme parameters) to indicate to the compare service the type of differences to look for between the two slide decks. In other instances, the user can use one of several preset comparison themes to indicate the type of differences to look for between the two slide decks. The theme application module 152 receives such a comparison theme from the user to feed to the comparing module 154.

The comparing module 154 works in conjunction with the receiving module 150 to receive the slide decks uploaded by the user. The comparing module 154 also works in conjunction with the theme application module 152 to receive a comparison theme selected by the user. The comparing module 154 performs a series of steps to detect differences between the two slide decks. The comparing module 154 compares each presentation slide of the first slide deck against a corresponding presentation slide of the second slide deck. For example, the first presentation slide of the first slide deck is compared against a first presentation slide of the second slide deck. In a common scenario, the second slide deck would be a later (and edited version) of the first slide deck, so each presentation slide of the first slide deck would have a corresponding presentation slide in the second slide deck. The comparing module performs such a slide to slide comparison for such "slide pairs" (i.e., corresponding slides from the two slide decks). In some instances the comparing module will convert the content of the received presentation to a standard representation before beginning the comparing process, regardless of the actual file format of the received presentation (e.g., .ppt, .pptx, etc.). In embodiments, If the corresponding slides are not in the same numerical position in the two presentations, the comparing module will consider similarities of slides in the first presentation to slides to the second presentation to detect correspondence. For example, if the first presentation slide in the first slide deck has moved to the seventh presentation slide in the second slide deck, this correspondence will be detected. Further processing of the two slide decks will continue according to the techniques described herein.

In scenarios where a user deletes a presentation slide in the second slide deck, the corresponding slide (i.e., the slide corresponding to the deleted slide) in the first slide deck will not have a "pair" element. In such scenarios, the slide pair is formed using just the single slide from the first slide deck. An empty slide is used as the corresponding slide for the single slide. A similar principle is used when a new slide is inserted in the second slide deck.

The comparing module 154 utilizes the parameters indicated in the comparison theme to perform the slide pair comparison analysis. For example, if the comparison theme is set at a "text-changes only" setting, only the text appearing in the two slides of a slide pair are compared for any changes. In an illustrative example, if a new text appears in the second slide, it is identified as an "inserted" change. Similarly, if a text from the first slide does not appear in the second slide, it is identified as a "deleted" change. If, for example, the comparison theme is set at "text and format changes," the two slides are compared for changes in text as well as for changes in formatting (e.g., font changes, changes in spacing between paragraphs, etc.).

A report generation module 156 works in conjunction with the comparing module 154 to record the various differences identified by the comparing module 154 for each of the slide pairs. In some instances, the report generation module 156 categorizes the various differences identified by the comparing module 154 based on one or more parameters. In one example, the report generation module 156 categorizes the differences based on a numbering of each slide pair (e.g., differences 1 and 2 between a first slide pair, differences 1 and 2 between a second slide pair, etc.). In one example, the report generation module 156 categorizes the differences based on the type of change/difference (e.g., text based differences, formatting based differences, slide master differences, etc.). Other examples for categorization of differences, as may be understood by one of ordinary skill in the art, are equally applicable in conjunction with the techniques described herein.

A comparison display module 158 uses the data from the comparing module 154 or the report generation module 156 to build a display of the comparison of the two slide decks. In one embodiment, the comparison service offers the use of one or more of the following views (or sections) in the comparison display screen: a slide selector section, a slide pair viewer section, and/or a slide change summary section. As explained in further detail below, each of these sections enables a user to view comparison differences and perform other operations related a review of the two slide decks.

The change service also includes an apply change module 160, which allows a user to select a preferred slide from each slide pair displayed using the comparison display module 158, and build a new slide deck using only the preferred slides from the two slide decks. In some instances, the user will be able to accept or reject individual changes detected by a comparison, producing a new slide deck containing, in addition to the contents of the original slide deck, only those changes that were marked as accepted. In some instances, the accepting or rejecting of changes will cause corresponding changes to be made to a working slide deck immediately, the contents of the working slide deck may or may not be visible to the user. Further details of the functionality of the apply change module 160 are provided with reference to FIGS. 6A, 6B, 7A, and 7B below.

Figure 1C:
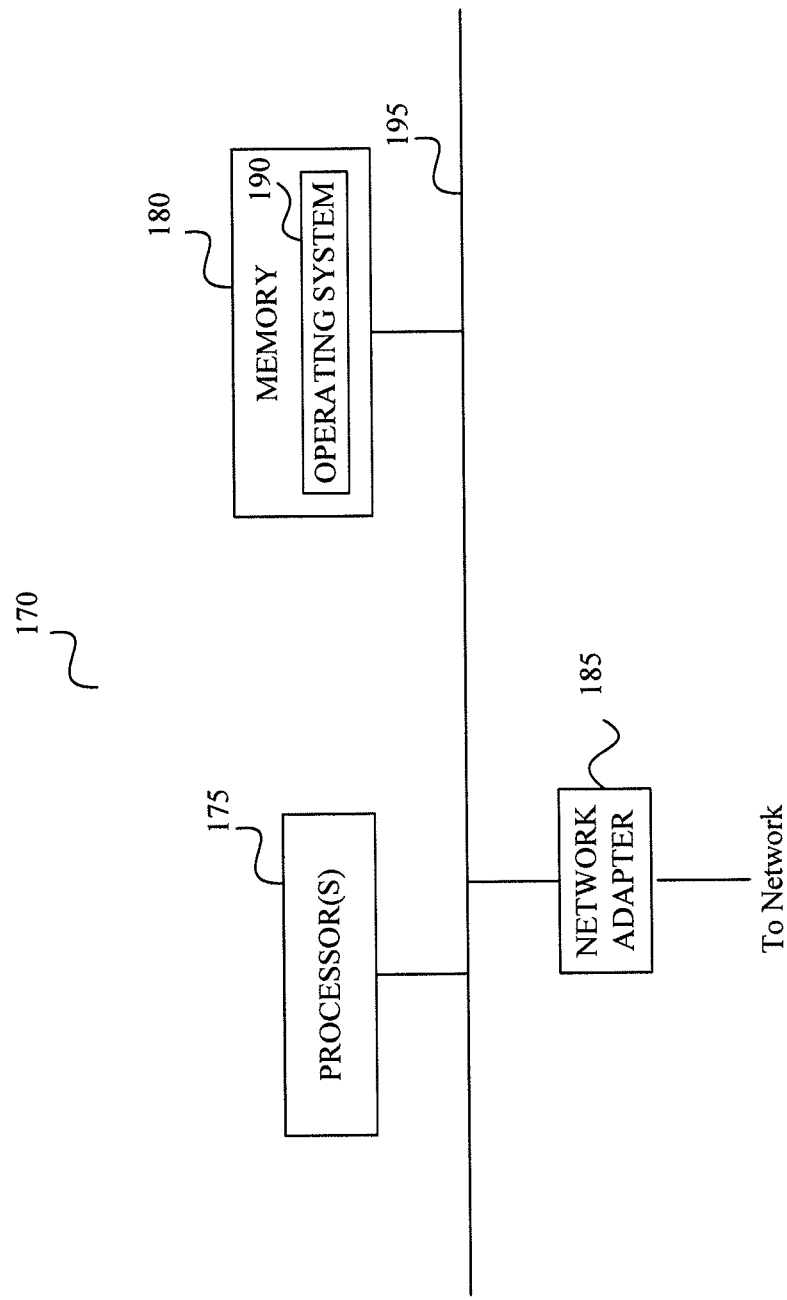
FIG. 1C is a high-level block diagram showing an example of the architecture for a computer system.

FIG. 1C is a high-level block diagram showing an example of the architecture for a computer system 170 that can be utilized to implement a personal computing device (e.g., 102 from FIG. 1A) for running a comparison service, a compare server 120, or a web server (e.g., 122 from FIG. 1A), etc. In FIG. 1C, the computer system 170 includes one or more processors 175 and memory 610 connected via an interconnect 195. The interconnect 195 is an abstraction that represents any one or more separate physical buses, point to point connections, or both connected by appropriate bridges, adapters, or controllers. The interconnect 195, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 175 may include central processing units (CPUs) to control the overall operation of, for example, the host computer. In certain embodiments, the processor(s) 175 accomplish this by executing software or firmware stored in memory 180. The processor(s) 175 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 180 is or includes the main memory of the computer system 170. The memory 180 represents any form of random access memory (RAM), read-only memory (ROM), flash memory (as discussed above), or the like, or a combination of such devices. In use, the memory 180 may contain, among other things, a set of machine instructions which, when executed by processor 175, causes the processor 175 to perform operations to implement embodiments of the present invention.

Also connected to the processor(s) 175 through the interconnect 195 is a network adapter 185. The network adapter 185 provides the computer system 600 with the ability to communicate with remote devices, such as the storage clients, and/or other storage servers, and may be, for example, an Ethernet adapter or Fiber Channel adapter.

Figure 2:
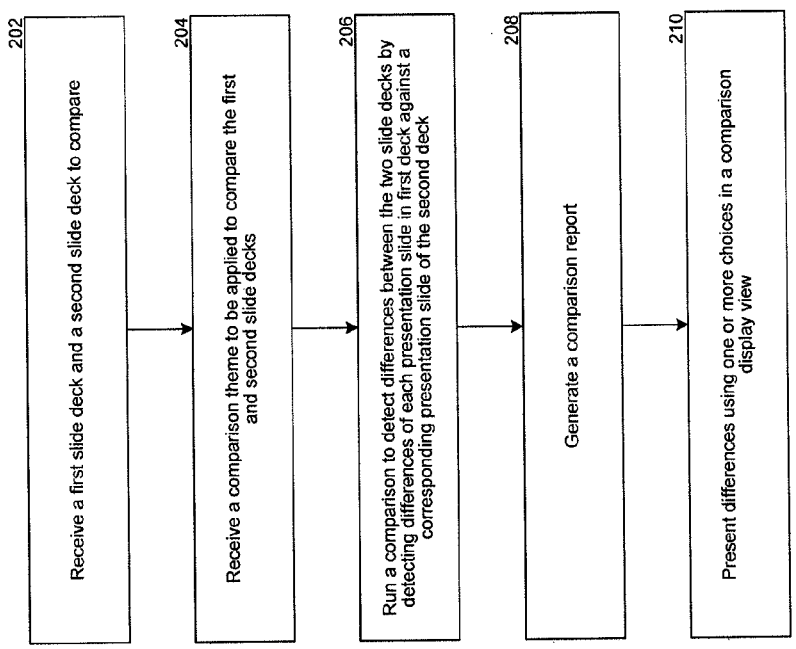
FIG. 2 is a flow diagram depicting an overall process used by the compare service.

FIG. 2 is a flow diagram depicting an overall process used by the compare service. As indicated in block 202, the compare service process receives a first slide deck and a second slide deck that are uploaded by a user. Subsequently, or concurrently, the process receives a comparison theme supplied by the user, as indicated in block 204. If a user does not supply a comparison theme, the process utilizes a preset or a default comparison theme. The process proceeds to block 206, where the process generates a comparison analysis to detect differences between the first slide deck and the second slide deck. As explained above, in some instances, the process compares each presentation slide of the first slide deck against a corresponding presentation slide of the second slide deck. Subsequent to detecting the differences, the process generates a comparison report detailing such differences, as indicated in block 208. In some instances, the process proceeds further to block 210, where the process presents a comparison display. The various components of such a comparison display are illustrated in detail with reference to FIG. 3.

Figure 3:
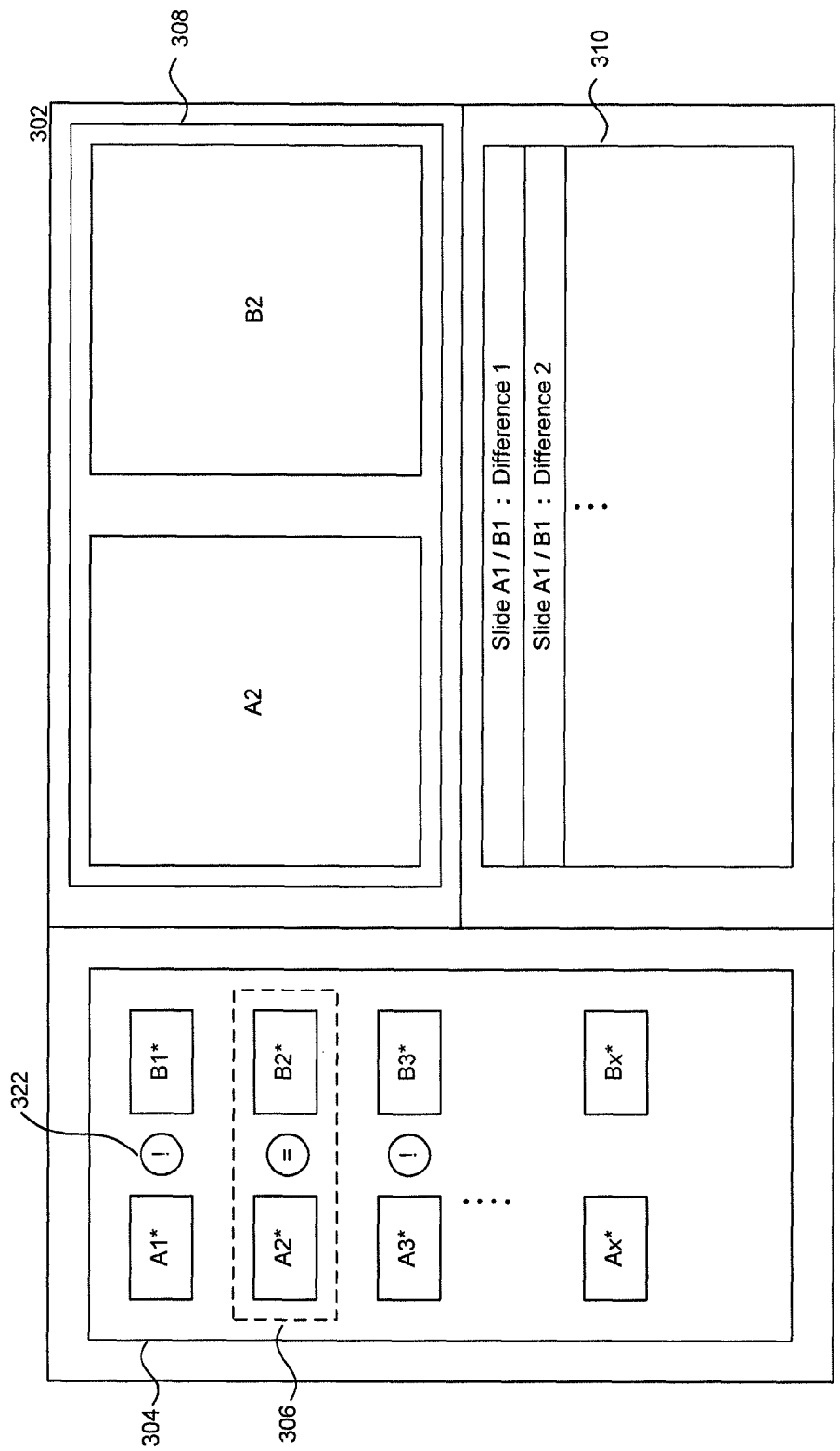
FIG. 3 is an exemplary architecture of a comparison display 302 as presented by the compare service.

FIG. 3 is an exemplary depiction of a comparison display 302 as presented by the compare service. In one embodiment, the comparison display 302 includes three major components: a slide selector section 304, a slide viewer section 308, and a change summary section 310. In some instances, the user can selectively turn on one or more of the three sections within the comparison display 302. In one embodiment, the comparison display 302 is configured to adapt to the dimensions of a display monitor being used to present the comparison display 302.

The slide selector section 304 includes a plurality of thumbnail pairs (e.g., the A1*-B1* pair, A2*-B2* pair, etc.), where each of the plurality of thumbnail pairs corresponds to one of the slide pairs. As explained above, each slide pair has a presentation slide (e.g., A1) from the first slide deck and a corresponding presentation slide from the second slide deck (e.g., B1). Accordingly, each of the plurality of thumbnail pairs includes two thumbnail images (e.g., A1* and B1*), and is a thumbnail representation of a corresponding slide pair (e.g., A1 and B1).

In one embodiment, the slide selector is not intended to provide an actual image of the slide pairs itself, but is intended as a quick and concise display of the various slide pairs in the slide decks. The slide selector enables the user to select one of the slide pairs for an expanded view display. In some instances, in addition to providing a thumbnail display of the slide pairs, the slide selector also provides a graphic indicator to indicate whether there are any differences between the constituent slides of each slide pair. In the example of FIG. 3, a graphic indicator (e.g., 322) is placed between the two constituent thumbnails of each thumbnail pair. The graphic indicator readily indicates whether there are any differences between the constituent slides of a corresponding slide pair. Based on this, the user can easily and conveniently choose (for expanded view) only those slide pairs that have changes or differences. In some instances, the user can customize the graphic indicator based on personal preferences or based on the type of differences between the constituent slides. For example, the user can choose a first unique graphic indicator for constituent slides with textual differences, a second unique graphic indicator for constituent slides with formatting differences, a third unique graphic indicator for constituent slides with both textual and formatting differences, etc.

When the user selects a particular thumbnail pair, the thumbnail pair is highlighted using a special graphic indicator (e.g., 306). A highlighted thumbnail pair indicates that the constituent slides are concurrently displayed in an expanded view in the slide pair viewer section 308. For example, in the example of FIG. 3, the thumbnail pair of A2*-B2* is selected. Accordingly, the slides A2 and B2 are displayed in the slide pair viewer section 308. The expanded view allows a user to view all the changes and/or differences between the two presentation slides. As explained above, the differences highlighted in the two presentation slides are based on the parameters set by the comparison theme that was previously applied. In an illustrative example, if the comparison theme is set to textual differences, then any differences in text between A2 and B2 are highlighted in the slides.

In one embodiment, the compare service provides the user several options to arrange the two constituent slides (e.g., A2 and B2) displayed within the slide pair viewer section 308. The options include, for example: displaying the two constituent slides horizontally adjacent to each other; displaying the two constituent slides vertically adjacent to each other; displaying the two constituent slides as tabbed views within a single monitor; displaying a first slide of the two constituent slides in a first display monitor and displaying a second slide of the two constituent slides in a second display monitor, when the first and the second display monitors are arranged in an extended-view configuration.

In some instances, a slide change summary section 310 provides a navigable version of a comparison report generated by the compare service. In a first example, the slide change summary section 310 lists a description of all changes and/or differences between the slides currently displayed in the slide pair viewer section 308. Each item of the list corresponds to one particular change and/or difference. In such an example, if a user clicks on any item of the list, the corresponding change and/or difference (that is described in that particular item) is visually highlighted in the slides displayed in the slide pair viewer section 308. This allows the user to easily browse through the differences in each slide pair and quickly identify the location of a particular difference in the slides by just clicking on a line item that describes the particular difference. In some instances, the compare service provides a search feature to allow the user to search for a particular message indicated in the slide change summary section 310. In some instances, the change summary section shows all changes for all slides rather than just changes for the selected slide. In such instances, clicking on a change that is not on the currently selected slide will update the currently-selected (or currently-displayed) slide to be the slide corresponding to the changes (i.e., the slide corresponding to the change that the user clicked on).

Figure 4:
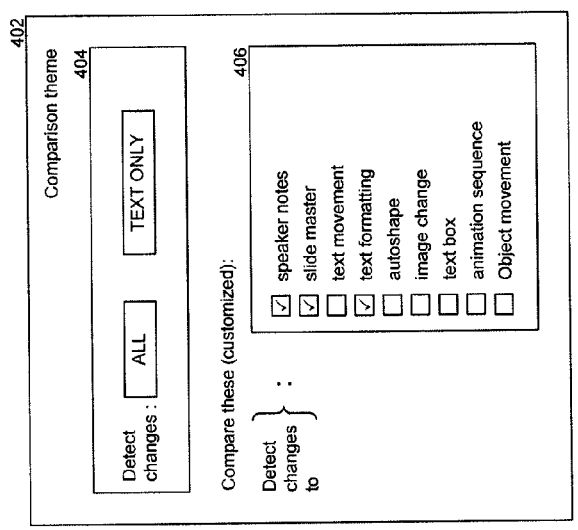
FIG. 4 illustrates an exemplary user-interface 402 to allow a user to establish a customized comparison theme.

FIG. 4 illustrates an exemplary user-interface 402 to allow a user to establish a customized comparison theme. The user, in some instances may use a preset comparison theme without having to select individual parameters from the parameter selection list 406. Within a preset theme setting 404, the user could choose, for example, detection of text-based changes only, or a detection of formatting changes only, or a detection of all types of changes. Additionally, or in lieu of choosing a preset comparison theme, a user can establish a customized comparison theme by selecting one or more parameters from a list of comparison parameters. Using these parameters, the user can choose to detect changes (between constituent slides of a slide pair) that are based only on the selected parameters. Examples of such parameters include: detecting a change to a speaker note; detecting a change to an image; detecting a change to an embedded object; detecting a change to a location of an item; detecting a change to a formatting of a first text; detecting a change to a formatting of a textbox; detecting a change to a slide background; detecting a change to a slide master; detecting a change to a hyperlink target; detecting a change to an autoshape; detecting a movement of a second text; detect a change in an animation sequence for a first object; etc.

As explained in detail below, it is noted that the user can change a comparison theme even after a comparison display is presented for two slide decks. The user can change the comparison theme at runtime by editing the parameters or changing a preset theme. When a user changes the comparison theme, the compare process generates a new comparison report (by identifying differences based on the newly updated comparison theme), and updates the comparison display accordingly to reflect the new changes.

Figure 5:
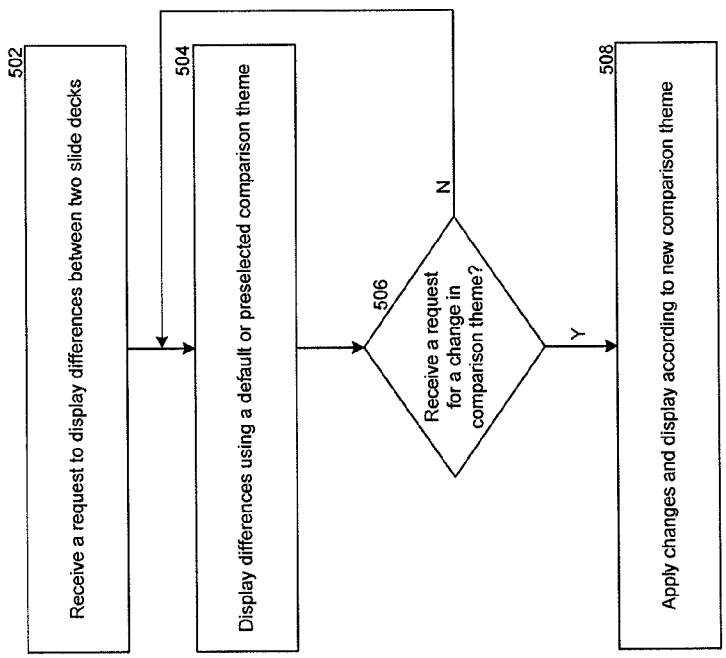
FIG. 5 is a flow diagram depicting a process for changing a comparison theme for detecting differences between two slide decks.

FIG. 5 is a flow diagram depicting a process for changing a comparison theme for detecting differences between two slide decks. As indicated in block 502, the compare service receives two slide decks that are to be compared. At block 504, the process applies a first comparison theme for comparing the two slide decks and presents a comparison display that is based on the first comparison theme. The process may use a default comparison theme if one is not provided by the user. At block 506, the user detects a request from the user to change the first comparison theme. When the process receives such a request, as indicated above, it re-generates a new comparison report based on a new second comparison theme identified by the user. The comparison display is also updated to reflect the changes induced due to the second comparison theme.

Figure 6A:
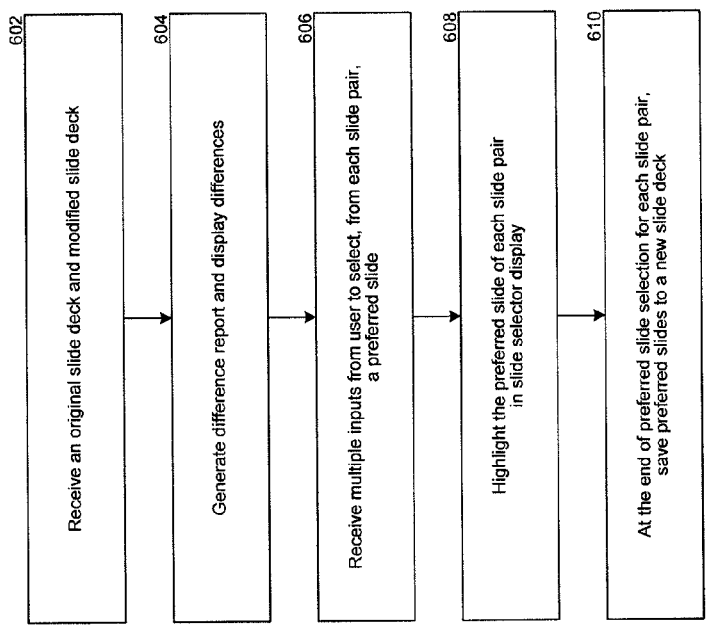
FIG. 6A is a flow diagram depicting a first process to allow a user to create a new slide deck by selecting preferred slides from slide decks displayed by the compare service.

FIG. 6A is a flow diagram depicting a first process to allow a user to create a new slide deck by selecting preferred slides from slide decks displayed by the compare service. In some instances, the user may want to review an original slide deck and a modified slide deck to review the changes. When, for example, doing an editorial review, the editor may wish to retain some slides from the original slide deck and some slides from the modified slide deck. To do this, the user may normally have to manually create a new slide deck file using a slide deck editing application (e.g., Microsoft Powerpoint®), and then manually copy over selected slides from files corresponding to the original slide deck and the modified slide deck. Instead, using the compare service, the user may simply make selections of "preferred slides" from each slide deck and have the compare service create a new file that contains only the preferred slides. The following sequence explains one example of such a process.

As indicated in block 602, the compare service receives an original slide deck and a modified slide deck for comparison. The compare service, as indicated in block 604, generates a difference report and displays the differences through a comparison display feature of the compare service. As indicated in block 606, in one embodiment, the change service allows the user to select a preferred slide from each slide pair displayed in the comparison display. In some instances, as indicated in block 608, a visual indicator may be used to highlight the preferred slide of each slide pair. In one example, such highlighting may be achieved by using a visual indicator over one of the thumbnail images in each thumbnail pair displayed in the slide selector section (e.g., 308 of FIG. 3). After the user completes selecting preferred slides from each slide pair, the compare process generates a new file (i.e., a new slide deck) that includes only those slides that were selected as preferred slides.

Figure 6B:
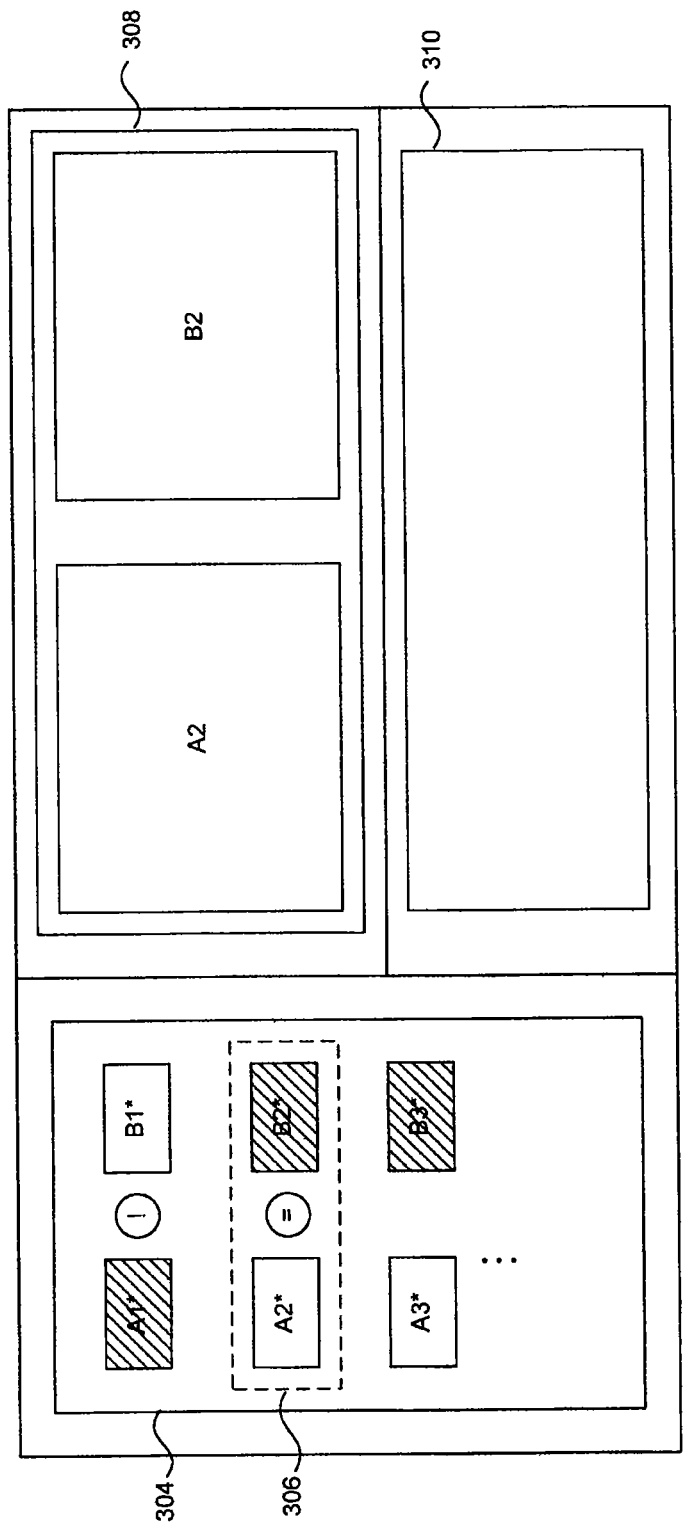
FIG. 6B is a first exemplary representation of a comparison display, illustrating how the preferred slides selected by the user are visually highlighted.

FIG. 6B is a first exemplary representation of a comparison display, illustrating how the preferred slides selected by the user are visually highlighted. In the illustrated example of FIG. 6B, the visual indication for preferred slides is achieved by providing highlights over the thumbnail image of a constituent slide that is selected as the preferred slide (e.g., A1 is the preferred slide in the A1-B1 slide pair, and so A1* in the slide selector section is visually highlighted).

Figure 7A:
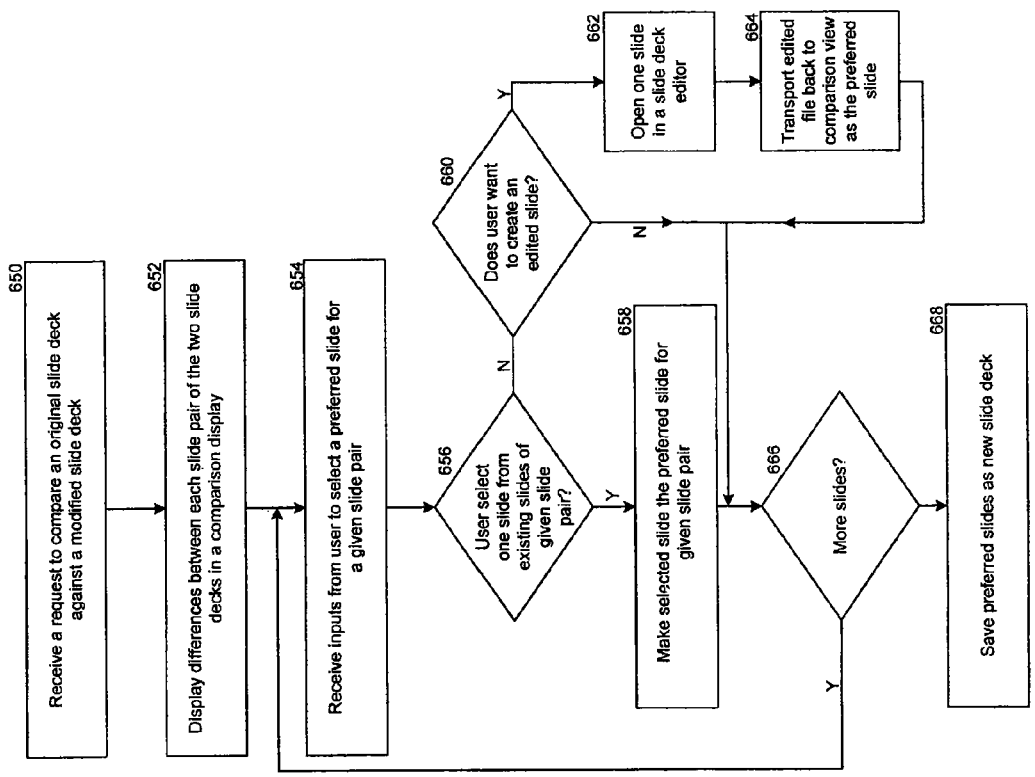
FIG. 7A is a flow diagram depicting a second process to allow a user to create a new slide deck by selecting preferred slides from slide decks displayed by the compare service.

FIG. 7A is a flow diagram depicting a second process to allow a user to create a new slide deck by selecting preferred slides from slide decks displayed by the compare service. In one embodiment, instead of choosing one of the two constituent slides of a slide pair, the user may wish to edit one of the constituent slides and use the edited slide as the preferred slide. The following example illustrates a process by which a user can use edited slides as preferred slides for building a new slide deck.

As indicated in block 650, the compare service receives an original slide deck and a modified slide deck for comparison. The compare service, as indicated in block 652, generates a difference report and displays the differences through a comparison display feature of the compare service. As indicated in block 654, in one embodiment, the compare service allows the user to selects a preferred slide from each slide pair of the displayed slide decks. At block 656, the process determines whether the user wishes to select one of the existing slides of a slide pair as a preferred slide. If the user selects one of the existing slides, the existing slide is marked as a preferred slide, as indicated in block 658. If, however the user does not use one of the existing slides of the slide pair, the process determines whether the user wants to create a new slide (or, an edited slide), as indicated in block 660. If the user indicates that he wants to create an edited slide for a particular slide pair, the process shifts to block 662, where the process opens one of the constituent slides of the slide pair (that is selected by the user) for editing in an associated slide deck editor (e.g., Microsoft Powerpoint®).

The user is then allowed to make edits to the slide. In some instances, the slide is opened in the editor in duplicate to allow the user to edit one slide (an "editable slide") and use the other as reference or backup (a "backup slide"). When the original and modified slides differ, both are opened in the editor so that the user can easily reference and work with content from either slide. In some instances, the user can make the choice by deleting the slide that he does not wish to retain. As indicated in block 664, the remaining slide is then transported back to the comparison display as the preferred slide selection for the given slide pair. In some instances, the edited slide is presented in both the slide selector section and the slide pair view section of the comparison display. In some instances, the differences and/or changes among the three slides for each "slide pair" is generated and presented in the comparison display.

As indicated in block 666, the process repeats for each given slide pair of the slide deck. When the user completes making a preferred slide selection for each slide pair, the comparison service generates a new file (i.e., a new slide deck) that includes only those slides identified as preferred slides.

Figure 7B:
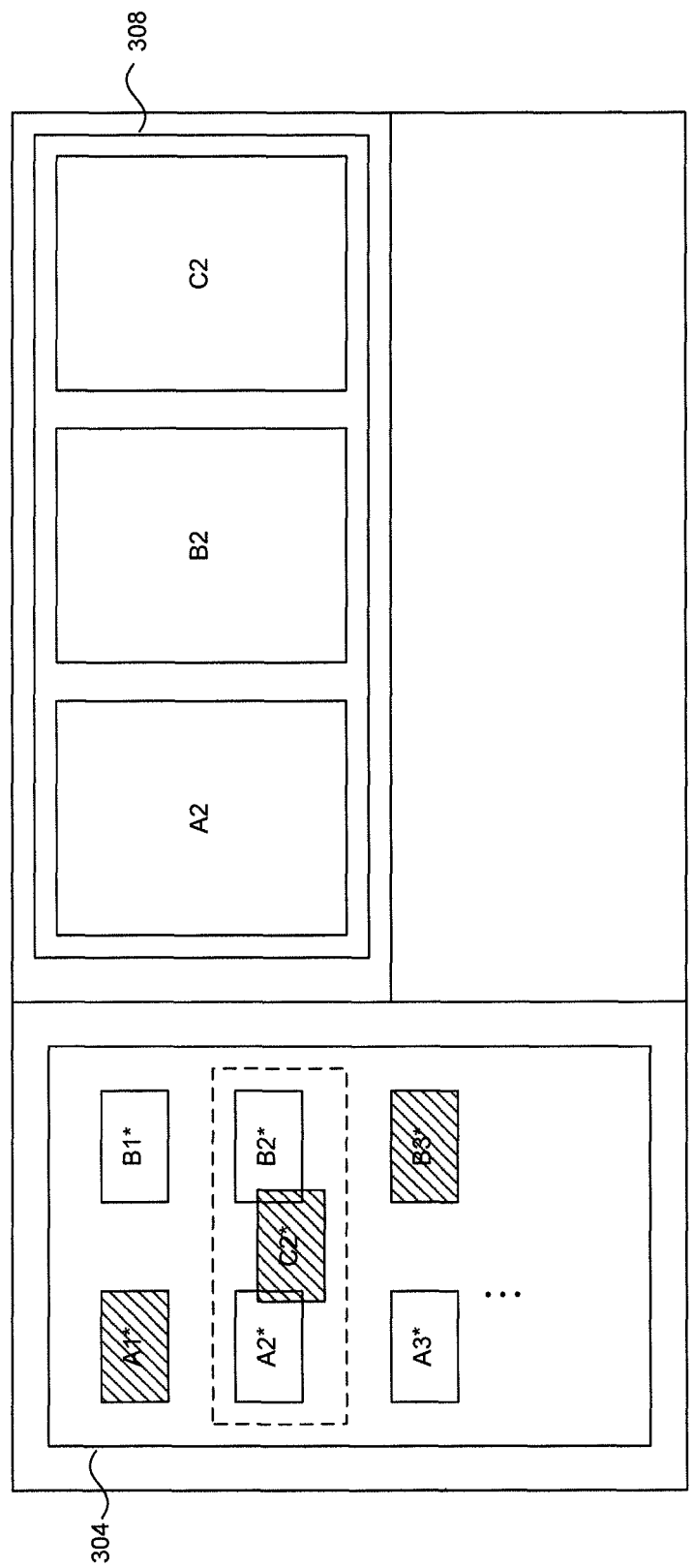
FIG. 7B is a second exemplary representation of a comparison display, illustrating how the preferred slides selected by the user are visually highlighted.

FIG. 7B is a second exemplary representation of a comparison display, illustrating how the preferred slides selected by the user are visually highlighted. In the illustrated example of FIG. 7B, the visual indication for preferred slides is achieved by providing highlights over the thumbnail image of a constituent slide that is selected as the preferred slide (e.g., A1 is the preferred slide in the A1-B1 slide pair, and so A1* in the slide selector section is visually highlighted). Additionally, if a user makes an "edited slide" selection for a particular slide pair, a thumbnail image of the edited slide is displayed in the thumbnail pair representation of the particular slide pair (e.g., C2* in the A2*-B2* thumbnail pair). In some instances, an expanded view of the edited slide (e.g., C2) is also provided in the slide pair viewer section.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method for comparing a plurality of slide decks, the method comprising:
    receiving a first slide deck to be compared, the first slide deck comprised of a first plurality of presentation slides, and
    receiving a second slide deck to be compared, the second slide deck comprised of a second plurality of presentation slides;
    receiving a selection of a comparison theme to be applied for comparing the first slide deck and the second slide deck;
    identifying, based on one or more parameters indicated in the comparison theme, a difference between each presentation slide of the first plurality of presentation slides and a corresponding presentation slide of the second plurality of presentation slides; and
    transmitting a comparison display of the first slide deck and the second slide deck to a remote computer in order to cause the remote computer to display the comparison as a concurrent single view comprised of:
        a slide selector to present a plurality of thumbnail pairs, each of the plurality of thumbnail pairs including a first thumbnail view of a presentation slide from the first plurality of presentation slides and a thumbnail view of a corresponding presentation slide from the second plurality of presentation slides;
        a slide pair viewer to present an expanded view of a first presentation slide and a second presentation slide included in a selected one of the plurality of thumbnail pairs, wherein the expanded view provides a visual markup of the difference between the first presentation slide and the second presentation slide; and
        a slide change summary to present a navigable comparison report wherein the navigable comparison report includes one or more difference values wherein each of the one or more difference values corresponds to a particular difference between the first presentation slide and the second presentation slide displayed in the slide pair viewer, and wherein, upon a user selecting a particular difference value of the one or more difference values a first visual indicator corresponding to the particular difference value being highlighted in at least one of the first presentation slide and the second presentation slide displayed in the slide pair viewer.

2. The method of claim 1, further comprising:
    providing a search functionality to enable a user to search for a specific text within the navigable version of the comparison report.

3. The method of claim 1, wherein the comparison theme includes the one or more parameters that form a basis for the comparison of the first slide deck and the second slide deck, wherein the one or more parameters for the comparison between two given presentation slides is comprised of at least one of:
    detecting a change to a speaker note;
    detecting a change to an image;
    detecting a change to an embedded object;
    detecting a change to a location of an item;
    detecting a change to a formatting of a first text;
    detecting a change to a formatting of a textbox;
    detecting a change to a slide background;
    detecting a change to a slide master;
    detecting a change to a hyperlink target;
    detecting a change to an autoshape;
    detecting a movement of a second text; or
    detecting a change in an animation sequence for a first object.

4. The method of claim 3, further comprising:
    enabling a user to customize the comparison theme by providing an interface to allow the user to select the one or more parameters to be included in the comparison theme.

5. The method of claim 1, further comprising:
    providing a plurality of preset comparison themes, the preset comparison themes including one or more of:
        a first preset comparison theme that causes only textual differences to be identified between the first slide deck and the second slide deck;
        a second preset comparison theme that causes only formatting differences to be identified between the first slide deck and the second slide deck; or
        a third preset comparison theme that causes both textual and formatting differences to be identified between the first slide deck and the second slide deck.

6. The method of claim 1, further comprising:
    receiving a request from a user to change the comparison theme for the comparison display of the first slide deck and the second slide deck;
    receiving a second selection of a comparison theme from the user;
    identifying differences between the first slide deck and the second slide deck based on the second comparison theme; and
    refreshing the comparison display of the first slide deck and the second slide deck to account for any change in differences resulting from use of the second selected comparison theme.

7. The method of claim 1, wherein each of the plurality of thumbnail pairs includes an indicator-graphic, the indicator-graphic visually indicating whether a constituent pair of presentation slides is identical or non-identical.

8. The method of claim 7, further comprising:
    enabling a user to customize the indicator graphic based on a type of difference between a given pair of presentation slides.

9. The method of claim 1, wherein the slide pair viewer provides a plurality of options for displaying the first presentation slide and the second presentation slide, the plurality of options including one of:

displaying the first presentation slide horizontally adjacent to the second presentation slide within a single display monitor;

displaying the first presentation slide vertically adjacent to the second presentation slide within a single display monitor;

displaying the first presentation slide and the second presentational slide as tabbed views within a single display monitor; or displaying the first presentation slide in a first display monitor and displaying the second presentation slide in a second display monitor when the first display monitor and the second display monitor are arranged in an extended-view mode configuration.

10. The method of claim 1, further comprising:

for each pair of presentation slides associated with the plurality of thumbnail pairs, enabling a user to identify a preferred presentation slide from the pair of presentation slides; and subsequent to the user identifying a preferred presentation slide from each pair of presentation slides, saving in memory each of the preferred presentation slides to create a third slide deck.

11. The method of claim 1, further comprising:

for each pair of presentation slides associated with the plurality of thumbnail pairs, enabling a user to identify a preferred presentation slide, wherein the preferred presentation slide is either one of the pair of presentation slides or an edited slide newly created by the user; and subsequent to the user identifying a preferred presentation slide from each pair of presentation slides, saving in memory each of the preferred presentation slides to create a third slide deck.

12. The method of claim 11, wherein, to enable a user to create a first edited slide for a given pair of presentation slides:

the user is provided an option to select one presentation slide from the pair of presentation slides;

the selected presentation slide is opened in a slide-deck editing application;

edits made by the user to the selected presentation slide are stored in memory as a new presentation slide using the slide-deck editing application; and the new presentation slide is incorporated into the comparison display as the first edited slide.

13. The method of claim 12, wherein a thumbnail view of the first edited slide is displayed in conjunction with thumbnail views of the given pair of presentation slides in the slide selector of the comparison display.

14. The method of claim 1, further comprising:

receiving the first slide deck and the second slide deck from a remote computer via a network.

15. The method of claim 14, wherein the network is an internet network.

16. The method of claim 1, wherein the first slide deck and the second slide deck are Microsoft Powerpoint® files.

17. A method for creating a new slide deck based on a comparison of an original slide deck and a modified slide deck, the method comprising:

receiving the original slide deck, the original slide deck comprised of a first plurality of presentation slides, receiving the modified slide deck comprised of a second plurality of presentation slides;

comparing each presentation slide of the first plurality of presentation slides against a corresponding presentation slide of the second plurality of presentation slides;

transmitting a comparison display of the original slide deck and the modified slide deck to a remote computer in order to cause the remote computer to display the comparison as a concurrent single view comprised of:

at least one slide pairs, each of the at least one slide pairs including a first presentation slide from the original slide deck and a corresponding second presentation slide from the modified slide deck and a slide change summary to present a navigable comparison report wherein the navigable comparison report includes one or more difference values wherein each of the one or more difference values corresponds to a particular difference between the first presentation slide and the second presentation slide displayed in the slide pair viewer and wherein upon a user selecting a particular difference value of the one or more difference values a first visual indicator corresponding to the particular difference value is highlighted in at least one of the first presentation slide and the second presentation slide displayed in the comparison display;

receiving a selection of a preferred slide corresponding to the at least one slide pairs, the preferred slide of a given slide pair being one of the following:

either the first presentation slide or the second presentation slide of the given slide pair; or an edited presentation slide that is created by editing either the first presentation slide or the second presentation slide of the given slide pair; and saving in memory each of the selected preferred slides pertaining to the at least one slide pairs to create the new slide deck.

18. The method of claim 17, wherein the user selects as an editable slide either the first presentation slide or the second presentation slide for opening in a slide editing application.

19. The method of claim 18, wherein subsequent to completion of edits to the editable slide, the editable slide is saved in memory as the edited presentation slide.

20. The method of claim 19 wherein the edited presentation slide is incorporated into the comparison display for presentation in conjunction with the first presentation slide and the second presentation slide of the given slide pair.

21. The method of claim 17 wherein if a first order of presentation slides corresponding to the original slide deck is different from a second order of presentation slides corresponding to the modified slide deck, the method further comprises:

evaluating similarities of particular presentation slides in the original slide deck to corresponding presentation slides in the modified slide deck; and establishing a new set of slide pairs based on the evaluated similarities.

22. A system for comparing a plurality of slide decks, the system comprising:

a processor;

a memory including a set of instructions executed by the processor, wherein the processor includes:

a receiving module configured to receive a first slide deck and a second slide deck to be compared, the first slide deck comprised of a first plurality of presentation slides, and the second slide deck comprised of a second plurality of presentation slides;

a comparison module configured to receive a selection of a comparison theme to be applied for comparing the first slide deck and the second slide deck and to identify, based on one or more parameters indicated in the selected comparison theme, a difference between each presentation slide of the first plurality of presentation slides and a corresponding presentation slide of the second plurality of presentation slides; and a comparison display module configured to transmit to a remote computer a comparison display of the first slide deck and the second slide deck, in order to cause the remote computer to display the comparison as a concurrent single view comprised of:

a slide selector to present a plurality of thumbnail pairs, each of the plurality of thumbnail pairs including a first thumbnail view of a presentation slide from the first plurality of presentation slides and a thumbnail view of a corresponding presentation slide from the second plurality of presentation slides;

a slide pair viewer to present an expanded view of a first presentation slide and a second presentation slide included in a selected one of the plurality of thumbnail pairs, wherein the expanded view provides a visual markup of the difference between the first presentation slide and the second presentation slide; and a slide change summary to present a navigable comparison report, wherein the navigable comparison report includes one or more difference values, wherein each of the one or more difference values corresponds to a particular difference between the first presentation slide and the second presentation slide displayed in the slide pair viewer and wherein, upon a user selecting a particular difference value of the one or more difference values a first visual indicator corresponding to the particular difference value is highlighted in at least one of the first presentation slide and the second presentation slide displayed in the slide pair viewer.

23. The system of claim 22, further comprising:
a search module configured to enable a user to search for a specific text within the navigable comparison report.

24. The system of claim 22, wherein the comparison module provides the user an option to select the one or more parameters that form a basis for the comparison of the first slide deck and the second slide deck, wherein the one or more parameters for the comparison between two given presentation slides comprised of at least one of:
detecting a change to a speaker note;
detecting a change to an image;
detecting a change to an embedded object;
detecting a change to a location of an item;
detecting a change to a formatting of a first text;
detecting a change to a formatting of a textbox;
detecting a change to a slide background;
detecting a change to a slide master;
detecting a change to a hyperlink target;
detecting a change to an autoshape;
detecting a movement of a second text; or
detecting a change in an animation sequence for a first object.

25. The system of claim 22, wherein the comparison module is configured to enable a user to create a customized comparison theme by providing a user interface to allow the user to select the one or more parameters to be included in the customized comparison theme.

26. The system of claim 24, wherein the comparison module is configured to provide a plurality of preset comparison themes, the preset comparison themes including one or more of:
a first preset comparison theme that causes only textual differences to be identified between the first slide deck and the second slide deck;
a second preset comparison theme that causes only formatting differences to be identified between the first slide deck and the second slide deck; or
a third preset comparison theme that causes both textual and formatting differences to be identified between the first slide deck and the second slide deck.

27. The system of claim 22 wherein the comparison display module is configured so that each of the plurality of thumbnail pairs includes an indicator-graphic, the indicator-graphic visually indicating whether a constituent pair of presentation slides is identical or non-identical.

28. The system of claim 27, wherein the comparison display module is configured to enable a user to customize the indicator graphic based on a type of difference between a given pair of presentation slides.

29. The system of claim 22, further comprising a change application module configured to enable a user to create a new slide deck, the creation of the new slide deck comprised of:
for each pair of a plurality of presentation slides associated with the plurality of thumbnail pairs, enabling a user to identify a preferred presentation slide from its corresponding pair of presentation slides; and
subsequent to the user identifying a preferred presentation slide from each of the plurality of pairs of presentation slides, saving in memory the preferred presentation slides in order to create the new slide deck.

30. The system of claim 22, further comprising a change application module configured to enable a user to create a new slide deck, the creation of the new slide deck comprising:
for each of a plurality of pairs of presentation slides associated with the plurality of thumbnail pairs, enabling a user to identify a preferred presentation slide, wherein the preferred presentation slide is either one of the pair of presentation slides the plurality of pairs or an edited slide newly created by the user; and
subsequent to the user identifying a preferred presentation slide from each of the plurality of pairs of presentation slides, saving in memory each of the preferred presentation slides to create the new slide deck.

31. A system for comparing a plurality of slide decks, the system comprising:
a processor:
a memory configured to store a set of instructions which when executed by the processor cause the system to perform a method the method comprising:
receiving a first slide deck and a second slide deck to be compared, the first slide deck including a first plurality of presentation slides, and the second slide deck including a second plurality of presentation slides;
receiving a selection of a preset comparison theme to identify, based on one or more parameters indicated in the selected comparison theme, a difference between each presentation slide of the first plurality of presentation slides and a corresponding presentation slide of the second plurality of presentation slides; and
presenting, within a single view, a comparison display of the first slide deck and the second slide deck, the comparison display comprised of:
a slide selector to present a plurality of thumbnail pairs, each of the plurality of thumbnail pairs including a first thumbnail view of a presentation slide from the first plurality of presentation slides and a thumbnail view of a corresponding presentation slide from the second plurality of presentation slides;

a slide pair viewer to present an expanded view of a first presentation slide and a second presentation slide included in a selected one of the plurality of thumbnail pairs, wherein the expanded view provides a visual markup of the difference between the first presentation slide and the second presentation slide; and a slide change summary to present a navigable comparison report, wherein the navigable comparison report includes one or more difference values, wherein each of the one or more difference values corresponds to a particular difference between the first presentation slide and the second presentation slide displayed in the slide pair viewer, and wherein, upon a user selecting a particular difference value of the one or more difference values a first visual indicator corresponding to the particular difference value is highlighted in at least one of the first presentation slide and the second presentation slide displayed in the slide pair viewer.

* * * * *

UNITED STATES PATENT AND TRADEMARK OFFICE
CERTIFICATE OF CORRECTION

| | | |
|---|---|---|
| PATENT NO. | : 8,473,847 B2 | Page 1 of 1 |
| APPLICATION NO. | : 12/844818 | |
| DATED | : June 25, 2013 | |
| INVENTOR(S) | : Glover | |

It is certified that error appears in the above-identified patent and that said Letters Patent is hereby corrected as shown below:

In the Claims

Column 13, Line 49: add the word --second-- between the words and a and the word thumbnail Column 17, Line 18: add the word --second-- between the word a and thumbnail Column 18, Line 40: delete the words "pair of"

Column 18, Line 41: add the word --comprising-- between the word slides and the words the plurality of pairs Signed and Sealed this
Twenty-ninth Day of October, 2013

Teresa Stanek Rea
*Deputy Director of the United States Patent and Trademark Office*